United States Patent Office 3,124,448
Patented Mar. 10, 1964

3,124,448
HEALING OF WOUNDS IN PLANT PRODUCTS
Gestur Johnson, Dept. of Chemistry, Endocrine Section, Colorado State University, Fort Collins, Colo.
No Drawing. Filed Jan. 4, 1961, Ser. No. 80,538
Claims priority, application Germany Jan. 6, 1960
8 Claims. (Cl. 71—2.4)

The present invention relates to the healing of wounds in plant products, and more particularly to methods and agents of accelerating the healing of wounds of plant products such as harvested potatoes and the like.

Since many plant product diseases occur by penetration of the organism through injuries or wounds to the plant products, the rapid healing of damaged tissue is an extremely important problem of the agricultural industry. This is particularly true in the case of harvest wounds of potatoes, sweet potatoes, and other root crops, especially those that are stored for a greater or lesser time. The healing of the wounds is of considerable importance in order to protect against the increase of pathogens during storage.

The healing of wounds in plants is also of importance in the case of cuttings of plants which are vegetatively propagated such as geraniums and carnations.

The healing of plant wounds occurs by the formation of a suberized or cork layer on the surface of the damaged tissue. The speed with which the suberized layer forms is of considerable importance in whether or not the suberization will effectively present pathogenic damage to the plant product.

The promotion of wound healing is of particular importance in the case of plants and plant products which have been irradiated with gamma rays or which have been subjected to chemical treatments in order to prevent sprouting, for example by the use of such anti-sprouting agents as the methyl ester of naphthalene acetic acid and isopropyl-N-(3-chlorophenyl)-carbamate.

It has been considered that the process of wound healing, or the formation of suber layers on damaged tissue of plant products, is hormonally influenced, and one of the methods used to stimulate wound healing has been to apply fresh tissue juices of other plants to the wounds. Attempts to stimulate the healing of wounds have also been made by the use of relatively simply chemical substances such as oleic acid and ricinoleic acid.

However, prior to the present invention no truly satisfactory solution to the problem has been found despite the fact that damage to the skin of products such as harvested potatoes occurs during the grading, washing and transportation thereof, and the loss due to such damage has been considerable.

It is accordingly a primary object of the present invention to provide agents which are highly effective in accelerating the healing of plant product wounds.

It is another object of the present invention to provide agents and a method of promoting the healing of plant product wounds such as the harvest wounds of potatoes, sweet potatoes and other root crops which protects such crops from an increase of pathogens during storage.

It is yet another object of the present invention to provide agents and methods of promoting the healing of wounds in plant products, which agents are effective even against the retardation of healing effect of such anti-sprouting treatments as irradiation with gamma rays and chemical treatments with anti-sprouting agents such as the methyl ester of naphthalene acetic acid and isopropyl-N-(3-chlorophenyl)-carbamate.

It is yet a further object of the present invention to provide a means of stimulating the wound healing of early harvested potatoes (dug before the skin is mature) which upon grading and washing are scuffered which results in the removal of tender skin and in minor cuts and bruises.

It is another object of the present invention to provide the healing of cuttings of plants which are vegetatively propagated such as geraniums and carnations.

It is still a further object of the present invention to provide a composition for accelerating the healing of wounds in plant products which is effective even with respect to plants which contain little or no polyphenol oxidase.

Other objects and advantages of the present invention will be apparent from a further reading of the specification and of the appended claims.

With the above and other objects in view, the present invention mainly comprises the acceleration of the healing of wounds in plant products by the application to such wounds of a polyhydric phenol selected from the group consisting of lithospermic acid, salts thereof, 2,4,5-trihydroxybenzoic acid, salts thereof, hydroxyhydroquinone, and 2,4,5-trihydroxyphenyl-n-propyl ketone.

The polyhydric phenol may be applied in the form of a dispersion or solution in a carrier, the amount of the polyphenol preferably being between about 0.1–10% by weight of the carrier, and most preferably about 0.2–2% by weight.

In accordance with a preferred embodiment of the present invention there is applied along with the polyhydric phenol a small amount of hydrogen peroxide, preferably about 0.02–5% which, as shall be further explained, has the effect of stimulating the formation of a suberized layer even in plants which contain little or no polyhydric phenol oxidase.

It has been found that the above mentioned polyhydric phenols greatly accelerate the wound healing of plants. In the healing of plant wounds the same occurs by formation of a suberized layer on the surface of the injured tissue, which acts as a mechanical barrier to the invasion of pathogens. In addition, there is also a chemical barrier set up in tissue adjacent to the injury in the form of an accumulation of phenols and other substances including various enzymes, particularly the oxidases, and the particular polyhydric phenols of the present invention have been found to have the effect of stimulating the formation of this chemical barrier as well as the formation of the suberized layer on the surface of the injured tissue.

As indicated above, in accordance with the embodiment of the present invention a small amount of hydrogen peroxide is added to the composition used to treat the plant wounds for stimulation of suberization and otherwise healing the wound. Although the scope of the invention is not meant to be limited to any theory of how or why the hydrogen peroxide is effective, the following theory is given in the hope that it will help others to better understand the invention. It is believed that the enzymatic oxidation of ortho-dihydric phenols by polyhydric phenol oxidase to quinones is necessary for the stimulation of suberization. This oxidation stimulates respiration. It is believed that the hydrogen peroxide has the effect of peroxidase so as to permit the oxidation of the ortho-dihydric phenols to the quinones and to thereby promote the suberization, even in the case of plants which contain little or no polyhydric phenol oxidase.

In general the polyhydric phenols of the present invention, namely lithospermic acid, salts thereof, particularly the sodium salt, 2,4,5-trihydroxy-benzoic acid and salts thereof, particularly the sodium salt, hydroxy-hydroquinone and 2,4,5-trihydroxyphenyl-n-propyl ketone have been found to be entirely effective in stimulating the healing of plant wounds, even in the case of plants which have been treated with anti-sprouting agents or with gamma rays to prevent sprouting.

The lithospermic acid which is used in accordance with the present invention is obtained by acid extraction of the ground root of *Lithospermum ruderale* plant with acid and recovery of lithospermic acid from the resulting acid solution. The following example illustrates the production of lithospermic acid from the roots of *Lithospermum ruderale* plant.

EXAMPLE 1

500 grams of dried, ground root of the *Lithospermum ruderale* plant are extracted at room temperature (72–75° F.) with 2.5 liters of distilled water to which sufficient hydrochloric acid has been added to give the extraction mixture a pH value of 2.5. The acidified water of the ground root mixture is continuously stirred for 30 minutes. If the pH increases during stirring more acid is added to bring the acidity back to pH 2.5.

The mixture is then filtered through a cotton milk filter with the aid of suction. The residue is then filtered through a cotton milk filter with the aid of suction. The residue is washed with 0.5 liter of very dilute hydrochloric acid solution (0.01 normal). The filtrate is then concentrated under reduced pressure to a volume of 750 ml. The concentrated extract is next centrifuged so that any insoluble material precipitating out during the concentration can be removed by decanting the clear supernatant liquid.

The lithospermic acid is removed from the clear acid solution by extracting the solution ten times with 100 milliliter portions of peroxide-free diethyl ether. The ether solution containing the lithospermic acid is dried by adding 20 g. of anhydrous sodium sulfate and allowing it to stand over night. The sodium sulfate is then removed by filtration. The ether solution is next concentrated to a volume of 50 ml. by distilling off the ether. The 50 ml. concentrate is then poured into an evaporating dish and more ether is allowed to evaporate until the residue becomes syrupy. The syrupy residue is finally dried at 50° C. in a vacuum oven to yield about 7.0 grams of lithospermic acid which is sufficiently pure to use for stimulation of healing of wounds in potato tubers and other plant tissues.

The lithospermic acid may be used in the pure form obtained above or a salt thereof, for example the sodium salt, may be prepared and the lithospermic acid may be used in the form of its salt.

Similarly caffeic acid and 2,4,5-trihydroxybenzoic acid may be used in the form of the free acid or in the form of a salt thereof, for example the sodium salt.

The compound 2,4,5-trihydroxyphenyl-n-propyl ketone may also be designated as 2,4,5-trihydroxybutyrophenone, this compound having the following structural formula:

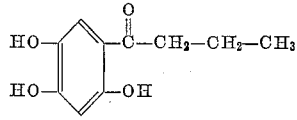

The polyhydric phenols of the present invention may be applied in various forms, for example in the form of a powder, or in the form of a solution or a suspension. Any normal carriers such as water, pyrophyllite, etc., may be used for this purpose.

The following examples illustrate the acceleration of wound healing of plants in accordance with the present invention. The scope of the invention is not, however, meant to be limited to the specific details of the examples.

The following series of examples illustrates the treatment of potato seeds:

EXAMPLE 2

The cut potato seed pieces are dipped in or sprayed with a water solution containing 0.2 percent hydroxyhydroquinone. The treated cut potato pieces can be planted immediately or stored for future planting. If stored, the treated and drained potato pieces are held at 60–70° F. for at least 24 hours before placing in cool storage (40° F.).

EXAMPLE 3

The cut potato seed pieces are dipped in or sprayed with a water solution containing 0.2 percent, 2,4,5-trihydroxybenzoic acid (sodium salt). The treated cut potato pieces can be planted immediately or stored for future planting. If stored, the treated and drained potato pieces are held at 60–70° F. for at least 24 hours before placing in cool storage (40° F.).

EXAMPLE 4

The cut potato seed pieces are dipped in or sprayed with a water solution containing 0.2 percent 2,4,5-trihydroxybenzoic acid (sodium salt) and 0.05 percent of hydrogen peroxide. The treated cut potato pieces can be planted immediately or stored for future planting. If stored, the treated and drained potato pieces are held at 60–70° F. for at least 24 hours before placing in cool storage (40° F.).

EXAMPLE 5

The cut potato seed pieces are dusted with an inert powder such as pyrophyllite containing 0.2 percent hydroxyhydroquinone. The treated cut potatoes can be planted immediately or stored for future planting. If stored, the treated potatoes are held at 60–70° F. for at least 24 hours prior to placing in cool storage (40° F.).

EXAMPLE 6

The cut potato seed pieces are dusted with an inert powder such as pyrophyllite containing 0.2 percent 2,4,5-trihydroxybutyrophenone. The treated cut potatoes can be planted immediately or stored for future planting. If stored, the treated potatoes are held at 60–70° F. for at least 24 hours prior to placing in cool storage (40° F.).

EXAMPLE 7

The cut potato seed pieces are dusted with an inert powder such as pyrophyllite containing 0.2 percent of 2,4,5-trihydroxybenzoic acid (sodium salt). The treated cut potatoes can be planted immediately or stored for future planting. If stored, the treated potatoes are held at 60–70° F. for at least 24 hours before placing in cool storage (40° F.).

The following example illustrates the stimulation of wound healing in early harvested immature potatoes:

EXAMPLE 8

The washed, sorted, whole potatoes are sprayed with a fine mist of a solution containing 0.2 percent 2,4,5-trihydroxybenzoic acid (sodium salt) and .05 percent hydrogen peroxide. This treatment can be carried out on the sorting belt of the ordinary commercial potato washing and grading equipment.

The following example illustrates the stimulation of wound healing in mature potato tubers which have also been treated with anti-sprouting agents or by irradiation with gamma rays to prevent sprouting during storage at a temperature somewhat warmer (50–60° F.) than the usual cold storage temperature (40° F.).

EXAMPLE 9

The washed, sorted potatoes are sprayed with a fine mist of a solution containing 0.2 percent 2,4,5-trihydroxybenzoic acid (sodium salt) and 0.05 percent hydrogen peroxide. These treatments can be carried out on the sorting belt of the ordinary commercial potato washing and grading equipment.

The following examples illustrate the treatment of sweet potatoes prior to storage:

EXAMPLE 10

Immediately after harvest and prior to storage, sweet potatoes are dipped or sprayed with a water solution containing 0.2 percent hydroxyhydroquinone or 2,4,5-trihydroxybenzoic acid (sodium salt). The potatoes are then allowed to dry before placing itno conventional storage.

EXAMPLE 11

Immediately after harvest and prior to storage, sweet potatoes are sprayed with a solution of 0.2 percent 2,4,5-trihydroxybenzoic acid (sodium salt) and 0.05 percent hydrogen peroxide. The potatoes are then allowed to dry before placing into conventional storage.

The following examples further illustrate the present invention:

EXAMPLE 12

The cut potato seed pieces are dipped in or sprayed with a water solution containing 0.2 percent lithospermic acid. The treated cut potato pieces can be planted immediately or stored for future planting. If stored, the treated and drained potato pieces are held at 60–70° F. for at least 24 hours before placing in cool storage (40° F.).

EXAMPLE 13

The cut potato seed pieces are dipped in or sprayed with a water solution containing 0.2 percent lithospermic acid and 0.05 percent of hydrogen peroxide. The treated cut potato pieces can be planted immediately or stored for future planting. If stored, the treated and drained potato pieces are held at 60–70° F. for at least 24 hours before placing in cool storage (40° F.).

EXAMPLE 14

The cut potato seed pieces are dusted with an inert powder such as pyrophyllite containing 0.2 percent lithospermic acid. The treated cut potatoes can be planted immediately or stored for future planting. If stored, the treated potatoes are held at 60–70° F. for at least 24 hours prior to placing in cool storage (40° F.).

EXAMPLE 15

Immediately after harvest and prior to storage, sweet potatoes are dipped or sprayed with a water solution containing 0.2 percent hydroxyhydroquinone or lithospermic acid. The potatoes are then allowed to dry before placing into conventional storage.

EXAMPLE 16

Immediately after harvest and prior to storage, sweet potatoes are sprayed with a solution of 0.2 percent lithospermic acid and 0.05 percent hydrogen peroxide. The potatoes are then allowed to dry before placing into conventional storage.

Structure of Lithospermic Acid

A great amount of chemical data and also infra-red and ultraviolet spectra show that lithospermic acid is a phenolic acid having a structural formula, hithertofore, not known to occur in nature. The chemical and spectrometric data so far obtained support the following structural formula for lithospermic acid.

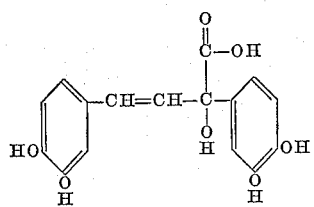

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Composition for healing wounds in plant products, comprising a carrier; 2,4,5-trihydroxybenzoic acid in an amount sufficient when applied to a plant wound to promote healing of the same and hydrogen peroxide.

2. Composition for healing wounds in plant products, comprising a carrier; lithospermic acid in an amount sufficient when applied to a plant wound to promote healing of the same and hydrogen peroxide.

3. Composition for healing wounds in plant products, comprising a carrier; hydroxyhydroquinone in an amount sufficient when applied to a plant wound to promote healing of the same and hydrogen peroxide.

4. Composition for healing wounds in plant products, comprising a carrier; 2,4,5-trihydroxyphenyl-n-propyl ketone in an amount sufficient when applied to a plant wound to promote healing of the same and hydrogen peroxide.

5. Composition for healing wounds in plant products, comprising a carrier; a polyhydric phenol selected from the group consisting of lithospermic acid, a sodium salt thereof, 2,4,5-trihydroxy-benzoic acid, a sodium salt thereof, hydroxyhydroquinone, and 2,4,5-trihydroxyphenyl-n-propyl ketone in an amount sufficient when applied to a plant wound to promote healing of the same; and hydrogen peroxide.

6. Composition for healing wounds in plant products, comprising a carrier; a polyhydric phenol selected from the group consisting of lithospermic acid, a sodium salt thereof, 2,4,5-trihydroxy-benzoic acid, a sodium salt thereof, hydroxyhydroquinone, and 2,4,5-trihydroxyphenyl-n-propyl ketone in an amount of about 0.1–10% by weight; and hydrogen peroxide in an amount of about 0.02–5%.

7. Method of accelerating the healing of wounds in plant products, which comprises applying to such wounds a polyhydric phenol selected from the group consisting of lithospermic acid, a sodium salt thereof, 2,4,5-trihydroxybenzoic acid, the sodium salt thereof, hydroxyhydroquinone, and 2,4,5-trihydroxyphenyl-n-propyl ketone in an amount sufficient when applied to a plant wound to promote healing of the same.

8. Method of accelerating the healing of wounds in plant products, which comprises applying to such wounds hydrogen peroxide and a polyhydric phenol selected from the group consisting of lithospermic acid, a sodium salt thereof, 2,4,5-trihydroxy-benzoic acid, a sodium salt thereof, hydroxyhydroquinone, and 2,4,5-trihydroxyphenyl-n-propyl ketone in an amount sufficient when applied to a plant wound to promote healing of the same.

References Cited in the file of this patent

FOREIGN PATENTS 203,758    Australia _____ Oct. 19, 1956

OTHER REFERENCES

Yang et al.: Chemical Abstracts, vol. 47, 1953, col. 8175(c).

Simonds: Chemical Abstracts, vol. 48, col. 9491(e), 1954.

Flaig et al.: Chemical Abstracts, vol. 49, col. 8395 (1955).

Knowles et al.: Chemical Abstracts, vol. 49, col. 7268(1), (1955).

Lipshits: Chemical Abstracts, vol. 54, col. 10065 (1960), abstract of 1959 article.